United States Patent
Millar et al.

(10) Patent No.: US 6,225,806 B1
(45) Date of Patent: May 1, 2001

(54) ELECTROSEISMIC TECHNIQUE FOR MEASURING THE PROPERTIES OF ROCKS SURROUNDING A BOREHOLE

(75) Inventors: John William Aidan Millar; Richard Hedley Clarke, both of Wiltshire (GB)

(73) Assignee: Court Services Limited (GB)

(*) Notice: Subject to any disclaimer, the term of this patent is extended or adjusted under 35 U.S.C. 154(b) by 0 days.

(21) Appl. No.: 09/043,095

(22) PCT Filed: Oct. 16, 1996

(86) PCT No.: PCT/GB96/02542
§ 371 Date: Apr. 17, 1998
§ 102(e) Date: Apr. 17, 1998

(87) PCT Pub. No.: WO97/14980
PCT Pub. Date: Apr. 24, 1997

(30) Foreign Application Priority Data
Oct. 17, 1995 (GB) .................................. 9521171

(51) Int. Cl.[7] .................................. G01V 3/26; G01V 3/18
(52) U.S. Cl. ...................... 324/353; 367/35; 324/323; 324/351
(58) Field of Search .................................. 367/25, 35, 37, 367/32, 27, 44; 166/249; 324/333, 323, 355; 342/22; 181/105, 108, 102

(56) References Cited

U.S. PATENT DOCUMENTS

| | | | |
|---|---|---|---|
| 2,974,273 | * 3/1961 | Vogel et al. | 367/189 |
| 3,599,085 | * 8/1971 | Semmelink | 324/1 |
| 4,427,944 | 1/1984 | Chandler | 324/353 |
| 4,821,035 | * 4/1989 | Hanson et al. | 340/856 |
| 4,904,942 | * 2/1990 | Thompson | 324/323 |
| 5,192,952 | * 3/1993 | Johler | 342/22 |
| 5,689,068 | 11/1997 | Locatelli | 73/152.02 |
| 5,841,280 | * 11/1998 | Yu et al. | 324/323 |
| 5,877,995 | * 3/1999 | Thompson et al. | 367/14 |
| 5,903,153 | * 5/1999 | Clarke et al. | 324/323 |

* cited by examiner

Primary Examiner—Hezron Williams
Assistant Examiner—Anthony Jolly
(74) Attorney, Agent, or Firm—Bartlett & Sherer; Ronald B. Sherer

(57) ABSTRACT

Apparatus and method for measuring the properties of rocks such as permeability, porosity and fluid properties downhole around a borehole (3) in which a seismic source (6) which radiates a seismic signal substantially radially within the borehole is lowered down the borehole (3) and the electrical signal generated by the seismic signal within the surrounding rock is detected by detectors (4, 5) mounted above and below the seismic source (6) so that signals are received from substantially all radial directions. Preferably a continuous wave signal is generated and the signal detected whilst the apparatus (1) is raised or lowered. The apparatus (1) gives a much better and more accurate measurement than previous methods.

19 Claims, 3 Drawing Sheets

ELECTROSEISMIC TECHNIQUE FOR MEASURING THE PROPERTIES OF ROCKS SURROUNDING A BOREHOLE

The present invention relates to a method and equipment for measuring the properties of subsurface rock from a tool lowered down a borehole. In particular it relates to a method and equipment for measuring such properties as the response time and amplitude of the electrokinetic coefficient, porosity and permeability of fluid-bearing porous rocks.

The measurement of permeability of rocks surrounding a borehole is important in assessing the location of water or oil reserves, including the quality and quantity of the reservoir rock. Existing methods are unable to measure the permeability of a porous rock directly with any accuracy from a downhole tool.

In addition to its value in the assessment of the quality and quantity of water or oil reservoirs, rock permeability is very important in determining at what rate and at what cost these fluids can be produced from boreholes.

U.S. Pat. No 3,599,085 describes a method in which a sonic source is lowered down a borehole and used to emit low frequency sound waves. Electrokinetic effects in the surrounding fluid-bearing rock cause an oscillating electric field in this and is measured at least two locations close to the source by contact pads touching the borehole wall. The electromagnetic skin depth is calculated from the ratio of electrical potentials and the permeability of the rock deduced. U.S. Pat. No 4,427,944 and the equivalent European Patent 0043768 describe a method which injects fluid at high pressure from a downhole tool to generate electrokinetic potentials; these are measured by contact electrodes against the borehole wall. The risetime of the electrical response is measured and from this the permeability of the porous rock is determined.

UK Patent 2,226,886A and the equivalent U.S. Pat. No 4,904,942 describe several arrangements for recording electrokinetic signals from subsurface rocks mainly with the electrodes for measuring the signals at or close to the earth's surface but including use of an acoustic source mounted on a downhole tool. There is no indication of permeability being deduced or of inferring porosity. A further related (inverse) method is described in European Patent 0512756A1, which contains several arrangements for setting out electrical sources and acoustic receivers (geophones) in order to measure electro-osmotic signals induced in subsurface rocks.

PCT Patent WO 94/28441 describes a method whereby sound waves of fixed frequency are emitted from a downhole source and the resulting electrokinetic potentials measured. An electrical source of fixed frequency is then used to produce electro-osmotic signals and the acoustic response measured. Using both responses together, the permeability is then deduced, provided the electrical conductivity of the rock is also separately measured.

In these methods the seismic shock is generated at intervals, which propagate out in one direction only from a tool in contact with the borehole wall and the electric signal generated by the electro kinetic effect is received from substantially that one direction. This and other defects in their construction has resulted in their only having a limited practicality.

We have now devised an improved method for measuring the properties of surrounding porous rocks from a tool located down a borehole which reduces these difficulties making the measurements quicker to carry out and more accurate and representative.

According to the invention there is provided a method of measuring properties of rocks surrounding a borehole which method comprises generating a seismic signal from a location in the borehole, which signal propagates within the borehole substantially radially in all directions, passing on through the borehole wall and surrounding rock detecting electrical signals arising in the rock surrounding the borehole and receiving and processing the electrical signals to measure the rock properties. Properties which can be measured by the method of the present invention include permeability, porosity and fluid properties.

The source of the seismic signal is preferably not in contact with the borehole wall but positioned substantially centrally within the borehole.

The seismic signal is propagated radially outwards in all directions through the borehole fluid (the fluid in the borehole e.g. drilling mud etc.) and, subject to distortion by the borehole wall and variations in the rock, the seismic signal propagates outwards substantially uniformly in all directions. The electrical signal generated within the surrounding rock is received and detected at the tool within the borehole from substantially all directions.

This invention also provides apparatus for measuring the properties of rocks surrounding a borehole, which apparatus comprises a casing adapted to be lowered down a bore hole in which casing there is a seismic means for generating seismic signals in substantially all radial directions and having associated therewith, a means adapted to detect electrical signals generated by the effect of a seismic shock generated by seismic means The means for generating the seismic signals preferably generates a series of pressure pulses or, more preferably, a continuous pressure oscillation, at one or more finite frequencies. It may consist of a mechanical vibrational device, an electromagnetic device, a sparker source, an explosive source, an airgun operated hydraulically or electrically or any other such conventional sonic source designed for use on a downhole tool but preferably it should be a magnetostrictive or piezoelectric transducer whose signal is controllable electrically. The term "seismic pulse" can include a pulse which can be referred to as a sonic or acoustic pulse.

A preferred means for enabling the seismic signal to be generated radially comprises a cylindrical chamber having holes in its side, which when downhole will be full of drilling fluid with the sides of the chamber being close to the sides of the borehole, there being a means to transmit a shock or applied force to the fluid in the chamber so as to cause the shock to be transmitted through the fluid in the chamber through the holes into the surrounding rock. The holes should be distributed substantially uniformly around the casing so that the shock is transmitted in all directions. The shock or force can be applied by any of the means referred to above.

The seismic signal can be generated whilst the apparatus is lowered or raised up from the borehole, thus providing a continuous or semi-continuous measurement of rock along the borehole.

The electrical signals can be detected by means of a pair of electrodes positioned within the borehole close to the borehole wall or, alternatively, a coil receiver mounted on the tool or, preferably, an electrode pair or short dipole antenna mounted on the tool aligned centrally within the borehole. In the equipment of the present invention it is convenient to use one or two electrical receivers placed above and below the acoustic source, the case of the dipole antennae preferably aligned vertically or horizontally above and below the source and in the case of the coils with the plane of the coil aligned vertically or horizontally at the centre of the borehole.

The electrical receiver preferably consists of one or two pairs of electrodes forming a short dipole antenna with electrically isolated ends or two coils with electrically isolated lines. For each pair the ends are preferably connected to an amplifier which amplifies the signals whilst keeping them electrically isolated; this is carried out by referring the potential of each end independently to a floating reference potential. The signals are preferably amplified and converted to digital form before being communicated (e.g. by wire) to the surface for recording and processing.

Preferably the means for detecting the electrical signals compares the potential at the ends, in the case of the dipole antenna, or measures the electrical field strength in the case of the coil. The potential at the ends of dipole antenna in the one case or of the coil in the other, are compared by connecting them to an amplifier in which the potentials are preferably referred to a non-earthed reference (a virtual earth) and these new potentials are amplified and compared. Such a procedure allows amplification with very little distortion of the potential to be measured and with a high degree of common-mode noise rejection and is superior to other conventional methods of amplification. Preferably the non-earthed reference potential is that of a common line in the amplification and data acquisition circuitry of the receiver and is not connected directly to earth.

Preferably there is provision for isolating and balancing the signals from each of the electrodes or coils before they reach the amplifier circuit in order to giver the maximum common-mode rejection of electromagnetic noise. This balancing can be achieved manually before running in a given borehole to compensate for variations in electrode performance in a given hole or by means of a suitable electronic circuit giving continuous feedback whereby continual adjustment can be made.

The seismic source preferably continuously emits sound simultaneously on at least two finite frequencies with the resultant oscillation the sum of the various sinusoidal pressure oscillations. Preferably if two frequencies are used these frequencies are from 50 to 200 Hz and 0.1 to 5 KHz, e.g. about 100 Hz and 1 KHz.

Preferably the amplified electrical signals are demodulated with respect to the source frequencies and the amplitude and phase relative to the source sampled at a frequency of about 1–100 Hz per channel and converted from analogue to digital form, of 12 or 16 bit accuracy. The digital data transmitted to surface is recorded as a data file and can then be processed.

The amplitude and response time of the electrokinetic response to an acoustic pulse have been shown to be closely related to the electrokinetic coefficient and the permeability of the target porous rock respectively. For a sonic oscillation of a known frequency the amplitude and phase of the electrical response time with response to the source is a function of both electrokinetic coefficient and permeability; however, measurement of amplitude of response on two frequencies allows each of these properties of the rock to be determined independently. After processing a log of rock permeability, electrokinetic coefficient, electrical conductivity and porosity can be produced. Alternatively, if the amplitude and phase of the electrokinetic response at a single frequency are measured, the permeability and porosity may be derived from these.

It is believed that the method of the present invention makes use of an electrokinetic effect in which the seismic wave generated by the seismic source and, passing through the interface of the borehole with the surrounding porous rock and through interfaces within the rock where the fluid properties change, stimulates electrical signals detected at the receiving electrodes or coils. The seismic oscillations within the porous rock give rise to fluid flow within the rock and as cations and anions adhere with differing strengths to capillary walls, a resulting electric dipole is generated within the rock. This electric dipole distorts the quasi-static electric field within the slightly conducting medium of the rock and this distortion propagates back to the tool, where it is measured.

The invention will now be described with reference to the accompanying drawings in which.

Figure 1:
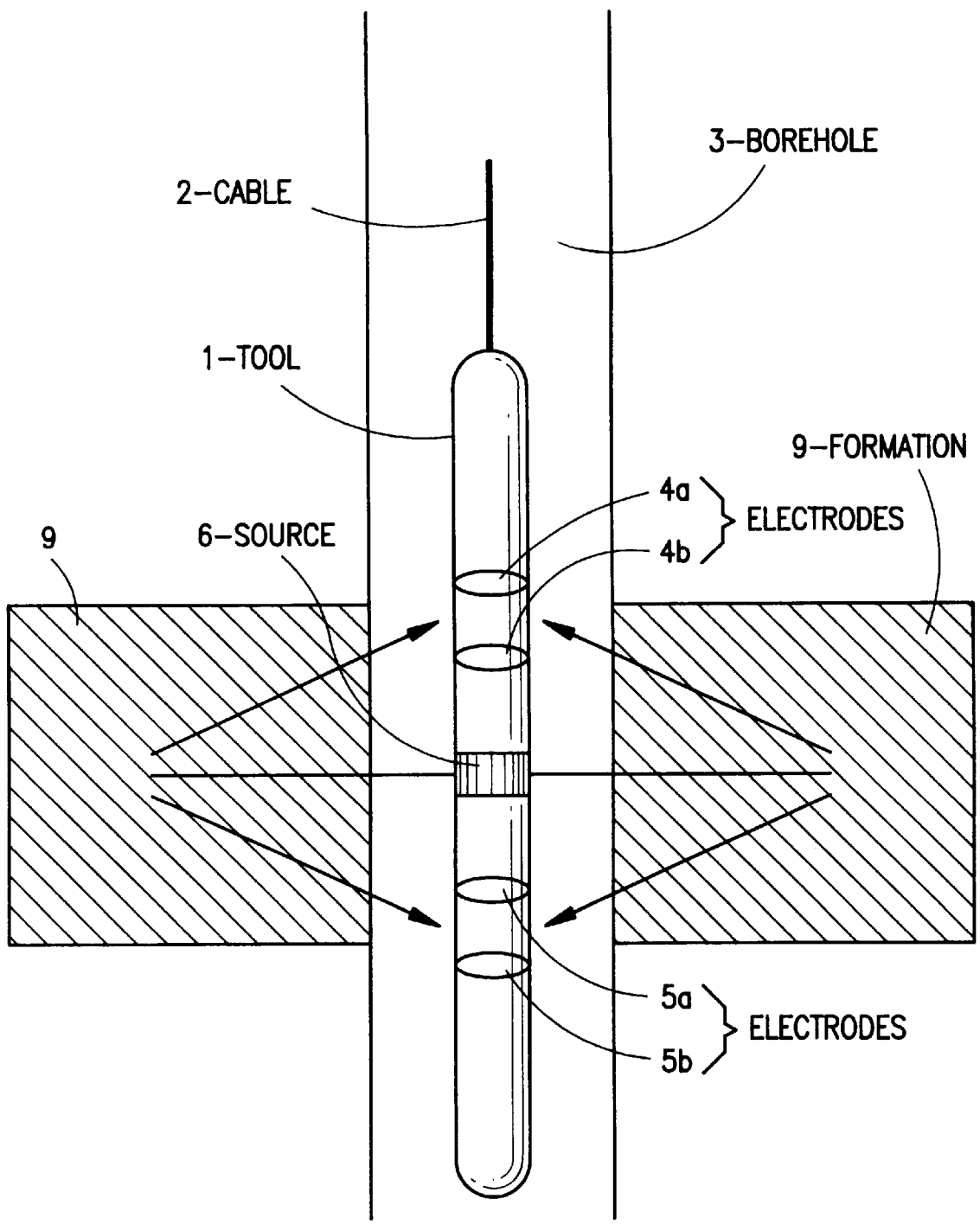
FIG.1 is a schematic view of the tool of the invention operating downhole.
Figure 2:
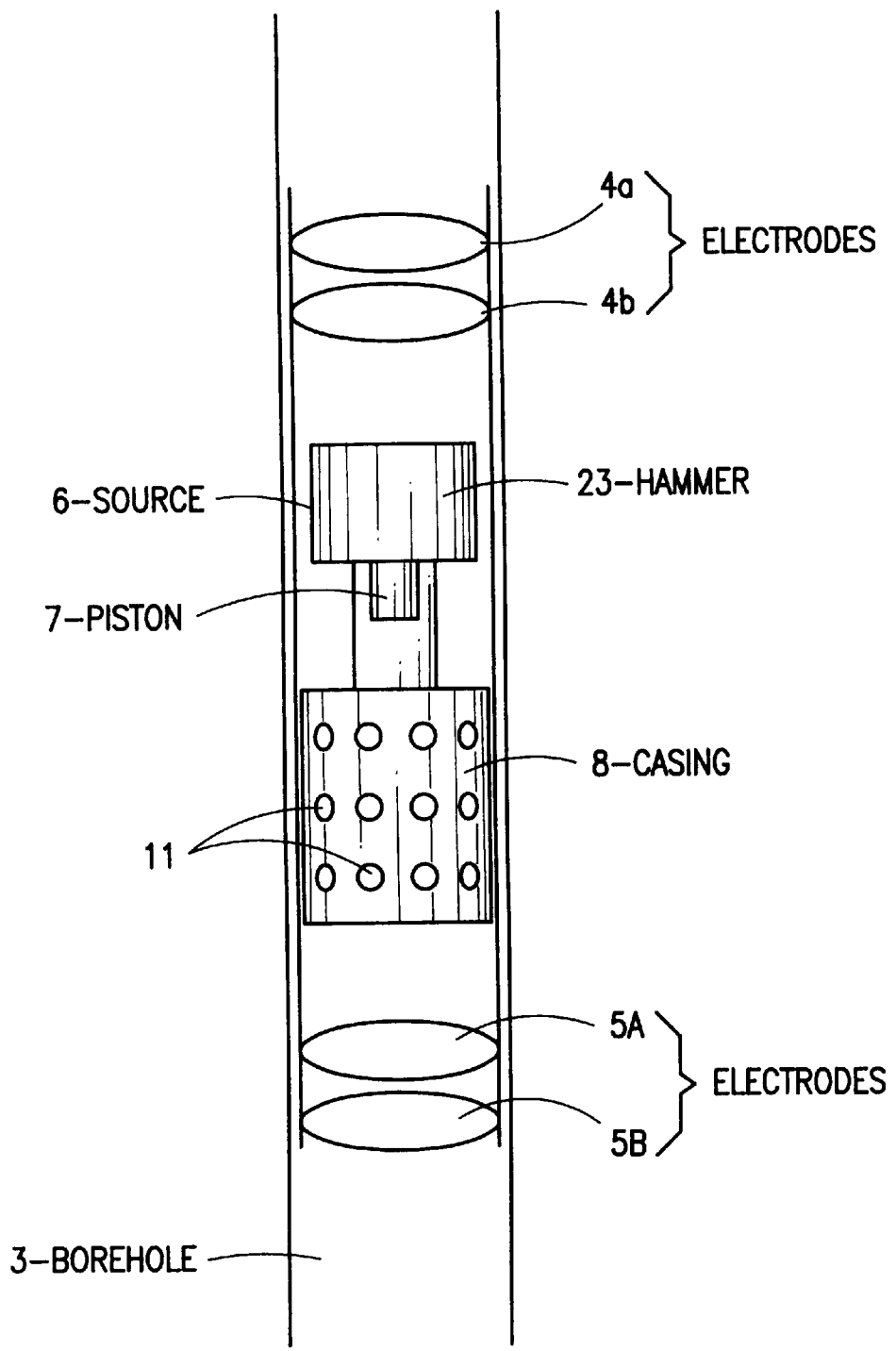
FIG. 2 is an enlarged view of part of the tool.

Referring to FIGS. 1 and 2, the downhole tool (1) is connected to a cable (2) so that it can be raised and lowered down borehole (3). In the tool are two antennae comprising two pairs of electrodes (4a, 4b) and (5a, 5b). There is a seismic source (6) which consists of a hammer (23) and piston (7) and a cylindrical chamber (8) with holes 11 disposed uniformly about it. In use, the tool (1) is lowered down the borehole (3) until it is in position. The hammer and piston (23) and (7) are activated to produce a seismic signal comprising continuous acoustic oscillations by compression of the drilling fluid which fills the borehole and the amplitude and response time of the electrokinetic signal generated measured. The seismic signal propagates through the holes in cylindrical chamber (8) via the drilling fluid.

Referring to FIG. 1, the seismic signal generates an electrical signal in fluid bearing rocks (9) which is detected by antennae (4) and (5).

Figure 4:
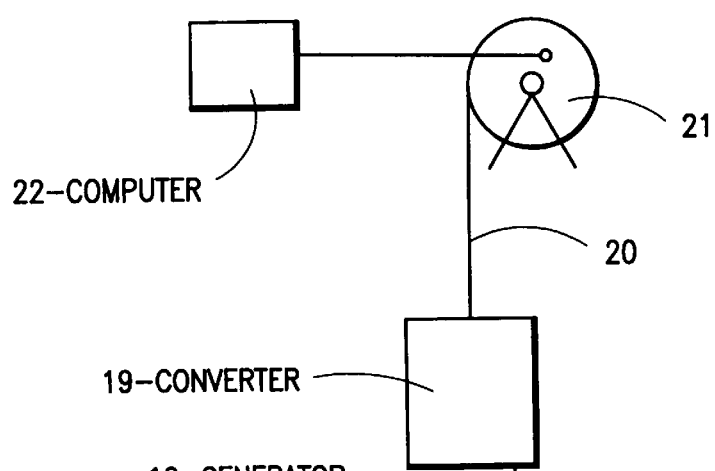
FIG. 4 is a circuit diagram of the connection of electrodes to amplifier.
Figure 4:
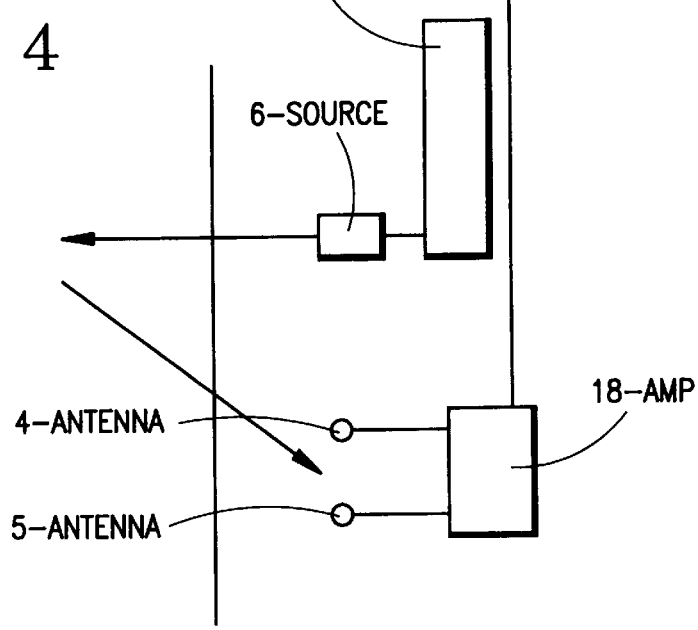

Referring to FIG. 4, the sonic source (6) is controlled by means of a controller/signal generator (10) and generates the seismic signal in the surrounding rock which generates an electrical signal picked up by antennae (4,5). These signals are passed to amplifier (18) where they are amplified and passed to converter (19), which converts then from analogue to digital form. These signals are then passed via data connectors (20/21) to computer (22) which controls, samples and records the data and finally processes and displays them.

Figure 3:
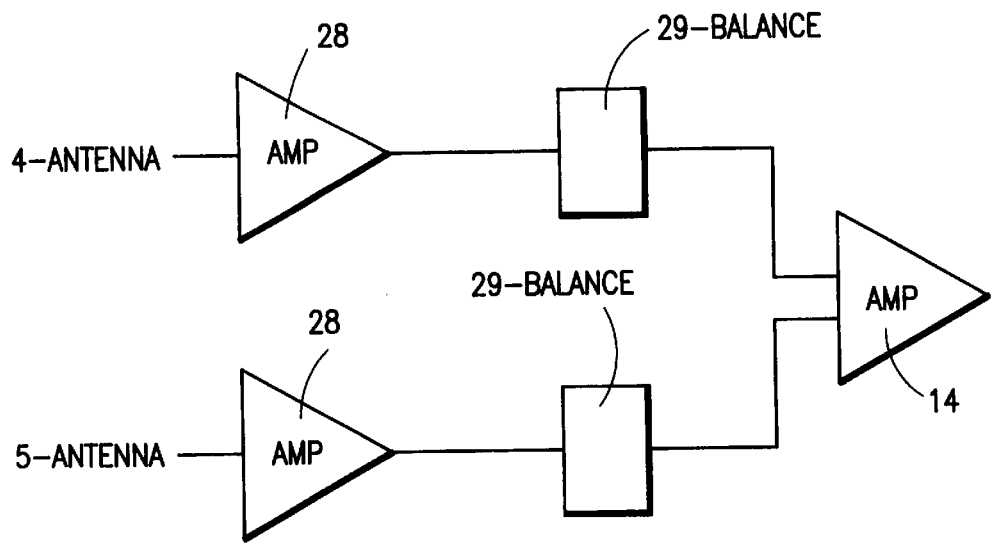
FIG. 3 is a circuit diagram showing amplifier connections.

Referring to FIG. 3, the signals from antennae (4,5) pass to a pair of low-noise operational amplifiers (28) which provide some gain, a low-pass filter and efficient common-mode noise rejection to (CMNR) at low frequencies whilst keeping the two channels isolated from each other. Independent balancing controls (29) control the balancing of CMNR in each line before they are compared and amplified by a final stage amplifier (14).

What is claimed is:

1. A method of measuring properties of a formation surrounding a bore hole having side walls comprising:
   (a) lowering seismic generator means into the bore hole;
   (b) maintaining said generator means spaced from said bore hole side walls;
   (c) operating said seismic generator means in said bore hole for radiating seismic signals in substantially all radial directions into said surrounding formation;
   (d) said seismic signals being such as to produce electrical response signals from said formation;

(e) positioning at least one electrical signal receiver means in said bore hole for receiving said electrical response signals;

(f) detecting said electrical response signals arising from the formation by said electrical receiver; and (g) processing said received electrical response signals to determine the properties of said surrounding formation.

2. The method of claim 1 wherein said electrical response signals are electrokinetic signals generated in said formation by said seismic signals and said properties include permeability.

3. The method of claim 1 including the step of maintaining drilling fluid in said bore hole, and maintaining said drilling fluid surrounding said seismic generator between said generator and said side walls of the bore hole.

4. The method of claim 1 in which said receiver means comprise at least one pair of electrodes, and including the step of isolating and balancing said electrodes.

5. The method of claim 1 in which said receiver means comprise at least one pair of electrodes, and includes the step of referencing said electrodes to a virtual earth.

6. The method of claim 1 wherein the step of operating said seismic generator comprises generating periodic pulses.

7. The method as claimed in claim 1 wherein said seismic signals are generated at multiple frequencies, and wherein the amplitudes of said electrical response signals are measured at each frequency.

8. The method as claimed in claim 1 wherein said electrokinetic signals include electrical phases, and wherein the phases of said signals are detected and measured.

9. The method of claim 1 including the steps of positioning at least two electrical receivers in said bore hole, and positioning said receivers above and below the position of said seismic generator.

10. The method of claim 1 wherein said response signals have response times, and said response times are detected and measured.

11. The method of claim 1 wherein the frequency of said seismic signals is in the order of 100 Hz to 1 KHz.

12. Apparatus for measuring the properties of a formation surrounding a bore hole, said bore hole having side walls and a diameter, comprising:

(a) casing means having a diameter significantly less than the diameter of the bore hole for being moved through the bore hole without contacting the side walls of the bore hole;

(b) a plurality of aperture means in said casing for admitting drilling fluid into said casing and increasing the propagation of seismic signals in all radial directions;

(c) seismic generator means in said casing for propagating seismic signals in all radial directions through said drilling fluid and said aperture means into the formation and for generating electrical response signals in said formation;

(d) detection means for detecting said electrical response signals, said detection means being adjacent said seismic generator means and being spaced from and not in contact with the side walls of the bore hole; and (e) processing means for processing said electrical response signals for determining the properties of said formation.

13. The apparatus of claim 12 wherein said processing means include means for determining the permeability of the formation.

14. The apparatus of claim 12, including means for referring said response signals to virtual earth.

15. The apparatus of claim 12 in which said detection means comprise first and second detection means, and said first and second detection means are located in said casing and positioned above and below said seismic generator means.

16. The apparatus of claim 12 in which said detection means comprise at least one coil for receiving said response signals.

17. The apparatus of claim 12 in which said detection means comprise at least one pair of electrodes.

18. Apparatus for measuring the properties of a formation surrounding a bore hole containing drilling fluid comprising:

(a) casing means, said casing means having a diameter less than that of said bore hole for drilling fluid to surround said casing between said casing and said bore hole;

(b) said casing having a plurality of apertures for admitting drilling fluid into said casing;

(c) sonic generator means in said casing for generating an acoustical signal and radiating said signal through said drilling fluid and said apertures radially outwardly in all directions into said formation; and (d) response signal detection means adjacent said casing means for detecting electrical response signals generated in said formation.

19. The apparatus of claim 18 wherein said response signal detection means are selected from the group comprising electrodes and coils, and wherein said detection means are positioned in and carried by said casing.

* * * * *